United States Patent
Logan et al.

(10) Patent No.: US 8,462,324 B2
(45) Date of Patent: Jun. 11, 2013

(54) MONITORING FIBERS IN AN OPTICAL RIBBON CABLE

(75) Inventors: Eric R. Logan, Hickory, NC (US); Kevin B. Sparks, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 288 days.

(21) Appl. No.: 12/944,479

(22) Filed: Nov. 11, 2010

(65) Prior Publication Data

US 2012/0120389 A1    May 17, 2012

(51) Int. Cl.
*G01N 21/00*    (2006.01)

(52) U.S. Cl.
USPC ........................................................ 356/73.1

(58) Field of Classification Search
USPC ........................................................ 356/73.1
See application file for complete search history.

(56) References Cited

U.S. PATENT DOCUMENTS

| | | | |
|---|---|---|---|
| 5,608,832 A | 3/1997 | Pfandl et al. ................... 385/112 |
| 5,790,294 A | 8/1998 | Horiuchi et al. ................ 359/177 |
| 5,825,515 A | 10/1998 | Anderson ....................... 359/110 |
| 5,943,124 A | 8/1999 | Haigh ........................... 356/73.1 |
| 5,991,013 A * | 11/1999 | Eslambolchi et al. ......... 356/73.1 |
| 6,621,966 B2 | 9/2003 | Lail ................................ 385/114 |
| 6,714,715 B2 | 3/2004 | Johnson ......................... 385/140 |
| 6,784,983 B1 * | 8/2004 | Bjerkan et al. ................ 356/73.1 |
| 7,142,737 B1 | 11/2006 | Murphy et al. .................. 385/13 |
| 7,206,469 B2 | 4/2007 | Murphy et al. .................. 385/13 |
| 7,272,289 B2 | 9/2007 | Bickham et al. ............... 385/128 |
| 7,302,143 B2 * | 11/2007 | Ginocchio et al. ............ 385/100 |
| 7,333,681 B2 | 2/2008 | Murphy et al. .................. 385/12 |
| 7,359,586 B2 | 4/2008 | Ivtsenkov ........................ 385/13 |
| 7,402,790 B2 | 7/2008 | Browning, Jr. et al. ....... 250/221 |
| 7,693,359 B2 | 4/2010 | Murphy et al. .................. 385/13 |
| 7,715,675 B2 | 5/2010 | Fabian et al. .................. 385/128 |
| 7,755,027 B2 | 7/2010 | Browning, Jr. et al. .. 250/227.14 |

FOREIGN PATENT DOCUMENTS

| | | |
|---|---|---|
| WO | WO01/27667 A2 | 4/2001 |
| WO | WO2006/074534 A1 | 7/2006 |
| WO | WO2007/019231 A2 | 2/2007 |

OTHER PUBLICATIONS

Steven A. Newton, "Characterization of the micro- and macrobending sensitivity of fibers by the MAC value," OFC '94 Technical Digest, 1994, 2 pages.

Yichun Shen, et al., "Single Mode Fibers with both Bending Loss Insensitivity and High Strength Intensity and their Applications to Indoor-Outdoor Cables for FTTH," International Wire & Cable Symposium, Proceedings of the 56th IWCS, 4 pages.

(Continued)

*Primary Examiner* — Tu Nguyen
(74) *Attorney, Agent, or Firm* — Russell S. Magaziner

(57) ABSTRACT

A system for monitoring an optical cable includes a cable having monitor fibers solely for monitoring cable status. The monitor fibers may be fibers selected from optical fibers having a higher mechanical sensitivity to mechanical stresses than other fibers in the cable, which may attenuate earlier than the other fibers in the event of cable degradation. The monitor fibers may be in communication with a transmitter and receiver, for transmitting and receiving a monitor signal. The receiver may be in communication with an alarm, the alarm being operative to send an alert signal when an increased attenuation is detected from the monitor signal, the increased attenuation being indicative of the status of the optical cable.

29 Claims, 3 Drawing Sheets

OTHER PUBLICATIONS

S. Ten, "Advanced Fibers for Submarine and Long-Haul Applications," Corning Incorporated, Science and Technology, IEEE Xplore, 2004, 2 pages.

Christopher Towery, et al., "Advanced Optical Fiber for Long Distance Telecommunication Networks," Presented at AMTC 2000, 10 pages.

Sudipta Bhaumik, "A New Approach to Evaluate Macro and Microbending Sensitivity of Single Mode Optical Fiber," Sterlite Optical Technologies Ltd., 9 pages.

International Telecommunication Union, ITU-T G.652, Series G: Transmission Systems and Media, Digital Systems and Networks, "Characteristics of a single-mode Optical Fibre Cable," Oct. 2000, 24 pages.

Quino, et al., "Power Loss Due to Macrobending in an Optical Fiber," Physics Department, Mindanao State University—Iligan Institute of Technology, 3 pages.

* cited by examiner

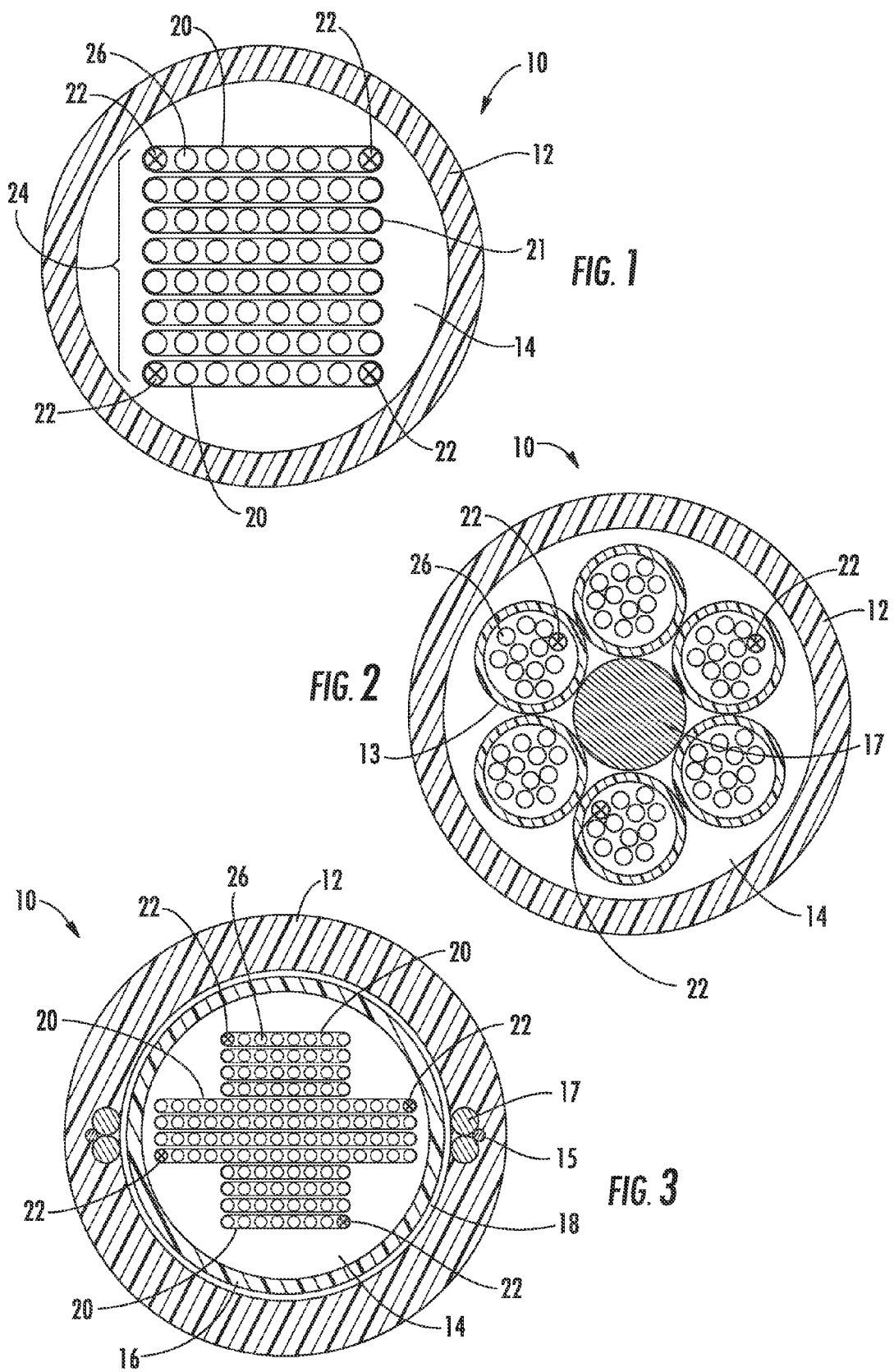

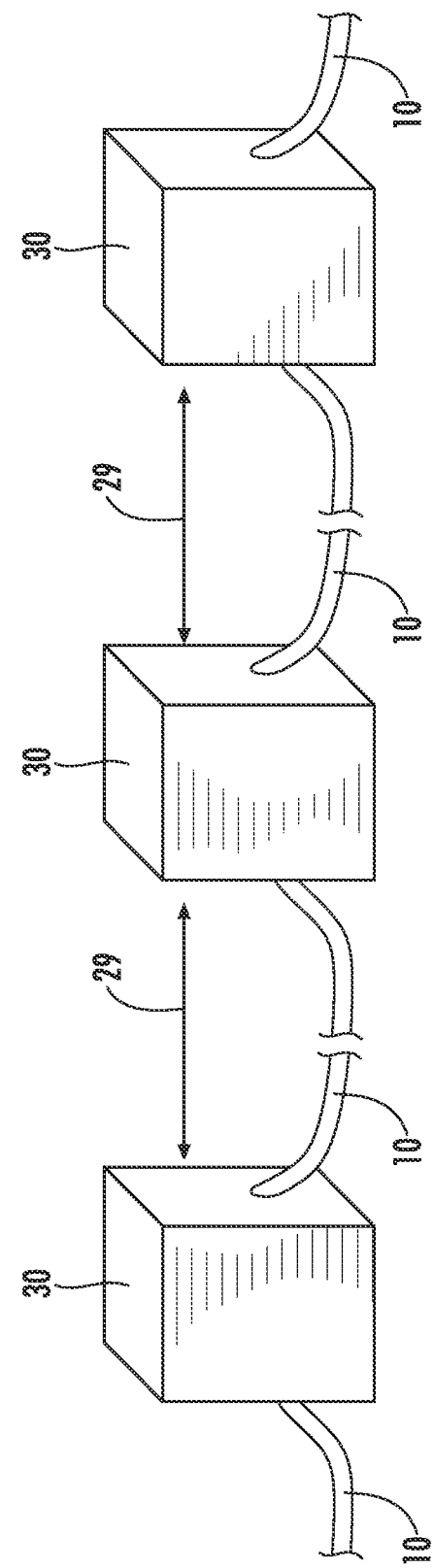

MONITORING FIBERS IN AN OPTICAL RIBBON CABLE

BACKGROUND

1. Field of the Disclosure

An optical cable is disclosed, specifically an optical cable having optical fiber ribbons in a stack that utilizes optical fibers having an increased mechanical sensitivity to determine potential cable degradation, with systems and methods therefor.

2. Technical Field

Recently, there has been an increased interest in very low attenuation fibers and cables for use in long-haul cabling systems. As a result there has been much development of so called low loss optical fibers being made into cables suitable for long haul applications. Size and capacity are, in many cases, driving factors in such development, leading to densely populated optical ribbon cables, such cables having a good balance of ease of manufacture, small overall cross section and high fiber counts. Long cable lay lengths for long haul systems mean that opportunities exist for cable degradation including, for example, undue cable tension, cable crushing, water immersion, etc.

A monitoring system is needed to provide an early warning indicator that a degradation event is imminent so that proactive steps may be taken to prevent permanent damage or degradation of the cable in order to maintain subscriber service.

SUMMARY

A system for monitoring the status of an optical cable is disclosed, the system including an optical cable including a jacket defining an interior, and at least one array of optical fibers within the interior, the array including at least one monitor fiber and at least one other optical fiber. The at least one monitor fiber may have a higher mechanical sensitivity to elevated mechanical stresses than the at least one other optical fiber, and the at least one monitor fiber being solely for monitoring the status of the optical cable. The system further may include at least one transmitter in communication with the at least one monitor fiber. The transmitter may be adapted for sending a signal, for example, a monitor signal, along the at least one monitor fiber. At least one receiver may also be in communication with the at least one monitor fiber. The receiver may be adapted for receiving the signal from the at least one monitor fiber. The receiver may be in communication with an alarm operative to indicate an increased attenuation of the monitor signal, the increased attenuation of the signal along the at least one monitor fiber being indicative of the status of the optical cable.

The monitor fiber may include optical fibers having a so called MAC value from about 0.0 to about 0.5 higher than the MAC value of the at least one other optical fiber for providing the higher mechanical sensitivity to elevated mechanical stresses than the at least one other optical fiber. The monitor fiber may also include optical fibers having an inner primary coating modulus value from about 0.5 MPa to about 1.5 MPa higher than the so called inner primary (primary) coating modulus value of at least one other optical fiber for providing the higher mechanical sensitivity to elevated mechanical stresses than the at least one other optical fiber.

The at least one array of optical fibers may be at least one optical ribbon stack having at least one monitor ribbon and at least one other optical fiber ribbon. The at least one monitor fiber may be located in the at least one monitor ribbon, and more specifically may be located on an edge of the at least one monitor ribbon for providing the higher mechanical sensitivity to elevated mechanical stresses than the at least one other optical fiber. In exemplary embodiments, the optical cable may include multiple monitor ribbons, each monitor ribbon including at least one monitor fiber on an edge of the monitor ribbon. In further exemplary embodiments, each monitor ribbon may include at least two monitor fibers, each monitor fiber being located on an edge of the monitor ribbon.

The signal may have, for example, a wavelength in the so called C or L band, the C or L band having a wavelength from about 1535 nm to about 1625 nm. The alarm may be operative to send an alert signal to an increased attenuation of the signal from about 1.0 dB to about 3.0 dB.

Additional features are set forth in the detailed description which follows, and in part will be readily apparent to those skilled in the art from that description or recognized by practicing the described embodiments and the claims, as well as the appended drawings.

It is to be understood that both the general description and the detailed description are exemplary, and are intended to provide an overview or framework to understand the claims. The accompanying drawings are included to provide a further understanding, and are incorporated in and constitute a part of this specification. The drawings illustrate one or more embodiment(s), and together with the description serve to explain principles and operation of the embodiments.

BRIEF DESCRIPTION OF THE DRAWINGS

FIG. 1 is a cross sectional view of a monitored cable having ribbon stack arrangement;

FIG. 2 is a cross sectional view of a monitored cable having loose fiber arrays;

FIG. 3 is a cross sectional view of a monitored cable having an alternate ribbon stack arrangement;

FIG. 4 is a schematic view of an array of amplifier hubs connected by monitored cables.

DETAILED DESCRIPTION

Figure 5:
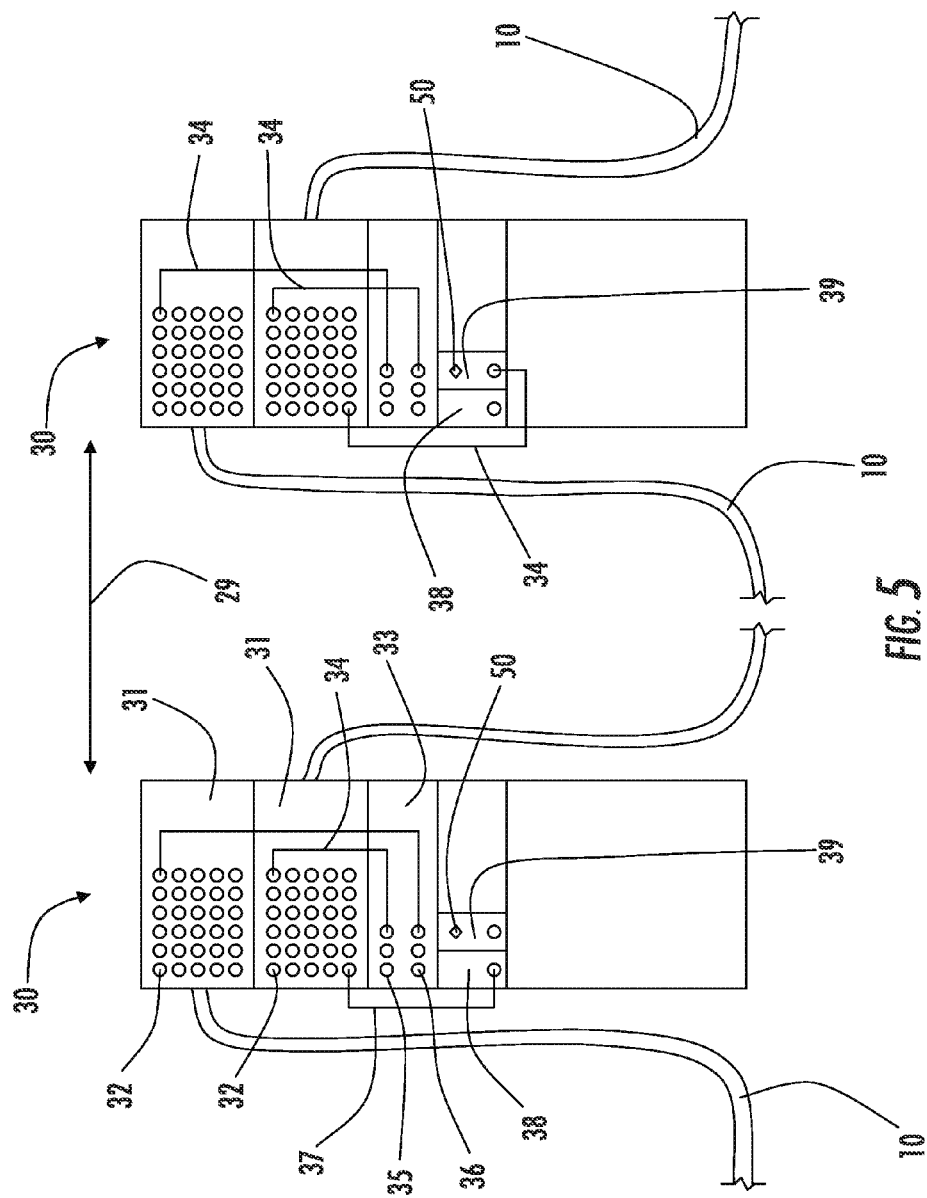
FIG. 5 is an elevation view of amplifier hubs connected by monitored cables.

Reference is now made in detail to embodiments of the disclosure, examples of which are illustrated in the accompanying drawings. Whenever possible, identical or similar reference numerals are used throughout the drawings to refer to identical or similar parts. It should be understood that the embodiments disclosed are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to, the embodiments described herein.

A cable is disclosed, the cable being adapted to be constantly monitored to determine the status of the cable. The cable may be, for example, a long haul cable, either buried or aerial, routed to amplifier hubs with as much as from about 70 km to about 100 km between the hubs. Over such a long distance, the cable may experience degradation, damage, or faulty installation, which requires early notification to prevent permanent damage to the cable or loss of live network traffic. The cable may have at least one monitor fiber, the monitor fiber being an optical fiber for monitoring the status of the cable. For example, no live network traffic passes through the monitor fiber, only a signal, for example, a monitor signal, from a monitor transmitter that may be received by a monitor receiver. The receiver may be in communication with an alarm that may react to a detected increase in a signal attenuation, for example, by triggering an indicator light, by sending an alert email, or by communicating with a more comprehensive monitoring system. The monitor fiber may be a fiber more sensitive to bending stress than the remaining fibers in the cable due to, for example, the relative location of the monitor fiber, the type of fiber used for the monitor fiber, or the mechanical properties of the fiber used for the monitor fiber.

A system for monitoring the status of an optical cable may include an optical cable 10. Cable 10 may be adapted to be continuously monitored, and includes at least a jacket 12 defining an interior cavity 14 (FIGS. 1-3). In exemplary embodiments, cable 10 may include at least one ripcord 15, a buffer tube 16, at least one strength element 17, and at least one water swellable tape 18 (FIG. 3). Cable 10 may include at least one optical fiber array, the array including at least one monitor fiber 22 and at least on other optical fiber 26. In some embodiments, the at least one fiber array may be a loose array of optical fibers, for example, in a S-Z stranded loose tube type cables, the fiber array surrounded by at least a buffer tube 13 (FIG. 2). In exemplary embodiments, the at least one fiber array may be an optical ribbon stack 24 having at least one monitor ribbon 20 and at least one other optical ribbon 21. Monitor ribbon 20 includes at least one monitor fiber 22 on an edge location. In other exemplary embodiments, monitor ribbon 20 includes at least two monitor fibers 20, one monitor fiber 20 on each edge location. The ribbons of ribbon stack 24, monitor ribbon 20 and the at least one other ribbon 21 have, in one embodiment, the same number of optical fibers. For example, each ribbon may have from 2 to 24 optical fibers.

In other embodiments, cable 10 may have ribbon stacks with optical ribbon fibers of different numbers of optical fibers in linear arrays, creating a stepped cross section. For example, monitor ribbon 20 and the at least one other ribbon 21 may have from 2 to 24 optical fibers arrayed, and may have adjacent ribbons with the same number of fibers; however, there may be, depending upon the size of cavity 14, optical ribbons having more fibers than monitor ribbon 20.

In one embodiment, cable 10 may include stacked optical ribbons of two or more differing widths (FIG. 3). For example, a stack of optical ribbons each having as many as 36 optical fibers may be located between a top stack and a bottom stack, the top and bottom stacks including ribbons having from 12 to 24 optical fibers each. Other stacking arrangements are possible. Multiple monitor ribbons 20 may be included, each having a monitor fiber 20, for example, located on an edge. Exemplary embodiments of cable 10 having such a ribbon arrangement may have four monitor fibers 22, each occupying, for example, an outermost location from a centroidal axis of jacket 12. Cable 10 may be a cable having up to, for example, 432 optical fibers.

Cable 10 may be, for example, a long haul cable in communication with a series of amplifier hubs 30 (FIG. 4). Hubs 30 may be separated by a distance of, for example, from about 70 km to about 100 km, with a corresponding lay length 29 of cable 10, traveling from one hub 30 to another, from about 70 km to about 100 km.

Hub 30 typically includes at least one cross connect 31, and in exemplary embodiments may include at least two cross connects 31 (FIG. 5). Cross connects 31 may be used, for example, to direct network traffic signals to an amplifier 33 and/or a dispersion compensation device, to boost the signals and send them along subsequent cables 10 to, for example, other such hubs 30. Cross connects 31 may transfer signal traffic from cable 10 to, for example, an amplifier 33 via adapters 32 connected to fiber optic patch cables 34. Amplifier 33 may have an input side 35 and an output side 36 for routing all network traffic from the cross connects 31 through amplifier 33. The signal for monitor fiber 22, however, may be routed from a monitor transmitter 38, for example, an LED, a laser transmitter or a VCSEL, along a jumper 34 to a monitor fiber interface 37, the monitor fiber interface 37 being a location on one of cross connects 31. The signal may then travel along monitor fiber 22 of cable 10 to another such hub 30, where, by way of cross connects 31 and jumper 34, the signal may be received by a monitor receiver 39, for example, a photodetector. In some embodiments, transmitter 38 and receiver 39 may include a transceiver in communication with both ends of monitor fiber 22. For the sake of clarity, only one monitor fiber 22 interfacing with two hubs 30 is disclosed. However, the interfacing of monitor fiber 22 and hubs 30 may be duplicated for multiple monitor fibers 22, each monitor fiber 22 connected, either directly or by way of cross connects 31 and jumpers 34, to a monitor transmitter 38 and monitor receiver 39. The signal may travel in a first direction for one particular monitor fiber 22 in cable 10, and in an opposite direction for a subsequent monitor fiber 22 in the same cable 10.

Monitor fiber 22 may be selected from fibers fiber having a higher mechanical sensitivity to elevated mechanical stresses than the other optical fibers, for example, fiber 26 (FIGS. 1-3), resulting in higher attenuation values under cable bending than the other fibers in the cable. Higher mechanical sensitivity for monitor fiber 22 than the other optical fibers in cable 10 may be achieved, for example, by locating monitor fiber 22 within a higher stress region of cable 10, selecting monitor fiber 22 from fibers having a higher so called MAC number value than the other optical fibers, or by selecting monitor fiber 22 from fibers having integrally higher mechanical sensitivity to microbending than the other optical fibers. Fibers having integrally higher sensitivity to microbending may include, for example, fibers with a primary layer having a higher Young's modulus value than the other optical fibers, or fibers not as suited to long haul applications, resulting in greater attenuation over distance, as the other optical fibers.

The location of monitor fiber 22 in a region of cable 10 that experiences greater mechanical stress, coupled with the signal wavelength, creates a fiber that is more sensitive to bending stress and one that will provide an early attenuation in the event of a so called microbend or macrobend. Microbending may occur, for example, when water is introduced to cavity 14, causing, for example, a water swellable material to impinge on the optical fibers, or by corrupting the interface of the coatings on the optical fiber itself to the core of the fiber. Macrobending may occur, for example, if a cable coil is installed with a bend radius which may be close to the specified bend radius tolerance of the cable. In such a case, the bend radius may be acceptable initially; however, thermal cycling may cause the cable to shrink, introducing macrobending problems in, for example, the corner fibers of the ribbon stack due to, for example, excess fiber length in the coil.

In long haul applications, for example, network traffic is typically sent along such optical fibers as single mode fibers, for example, non-zero dispersion shifting fibers, that are designed to mitigate attenuation and dispersion for long distances. Cables containing such non-zero dispersion shifting fibers, for example, LEAF® Optical Fiber available from Corning Incorporated of Corning, N.Y., or cables containing other suitable single mode fibers, may be used to send network traffic for long distances before amplification and dispersion compensation are necessary. In some embodiments, monitor fiber 22 also may be, for example, such a non-zero dispersion shifting fiber.

In other embodiments, monitor fiber 22 may be a single mode fiber having a so called MAC number value higher than the other optical fibers in the cable. The MAC number is a unitless value of relative sensitivity to bending stresses that is calculated from two characteristics of an optical fiber, Mode Field Diameter (MFD) and cutoff wavelength ($\lambda_{cutoff}$), using the equation:

$$MAC = \frac{MFD}{\lambda_{cutoff}}$$

MFD is a measure of the width of a beam of light propagating in a single-mode fiber. Put another way, it is the width across a Gaussian optical power distribution, measured in μm, at which the optical power is reduced to $e^{-2}$ of the maximum power MFD may be evaluated using such tests, for example, as EIA/TIA-455-191 (FOTP-191), *Measurement of Mode-Field Diameter of Single-Mode Optical Fiber*, EIA/TIA-455-164 (FOTP-164) *Measurement of Mode Field Diameter by Far-Field Scanning (Single-mode)*, and EIA/TIA-455-164 (FOTP-167) *Mode Field Diameter Measurement, Variable Aperture Method in Far-Field*. Cutoff wavelength is the minimum wavelength at which an optical fiber will support only one propagating mode. Wavelengths below the cutoff wavelength may propagate in multiple modes, which may interfere with each other, making the modes unreliable. Cutoff wavelength may be evaluated using such standard fiber optic test procedures as, for example, EIA-445-80 (FOTP-80) *Cutoff Wavelength of Uncabled Single-mode Fiber by Transmitted Power*. The MAC number value may be calculated based upon the results of such testing standards.

Generally, a fiber having a higher relative MAC number than another optical fiber may be more sensitive to bending stresses. By way of example, monitor fiber 22 may have a MAC number value from about 7.6 to about 8.0. Other optical fibers in cable 10 (e.g., fiber 26) may have a MAC number value from about 7.2 to about 7.6. In exemplary embodiments, monitor fiber 22 may have a MAC number that is up to about 0.8 higher than the other optical fibers in cable 10.

The so called Young's Modulus of a cured polymer coating on an optical fiber is another property that affects bending sensitivity. Young's Modulus is defined as a measure of the stiffness of an isotropic elastic material, for example, a UV curable polymer coating on the optical fiber. Most optical fibers use a so called dual coating system, with a relatively soft inner primary (primary) layer and tougher outer primary (secondary) layer. Generally, a higher modulus for the primary layer will result in a fiber that is more sensitive to bending stresses. Most long haul optical fiber has, for example, a primary layer with a Young's modulus of about 0.5 MPa. In some embodiments, monitor fiber 22 may be selected from single mode fibers having a primary layer with a Young's Modulus of from about 0.5 MPa to about 2.0 MPa. In exemplary embodiments, monitor fiber 22 may be selected from single mode fibers having a primary layer with a Young's modulus from about 1.0 MPa to about 1.5 MPa. As used herein, the Young's modulus of a cured polymer coating of a primary coating may be measured using, for example, a tensile testing instrument on a sample of the cured polymer coating material shaped as a film between about 0.003" (76 μm) and 0.004" (102 μm) in thickness and about 1.3 cm in width, with a gauge length of 5.1 cm, and a test speed of 2.5 cm/min.

For purposes of selecting monitor fiber 20, Young's modulus may be found on a prospective optical fiber, in situ, by testing a 6" sample of the fiber in question to establish the shear modulus for the primary coating, and calculating the Young's modulus value. The sample is prepared for testing by stripping off about 1" of the dual coating (primary and secondary coatings) from the center of the 6" optical fiber sample. The sample is then aligned such that a small section, about 5 mm, of the coated fiber near the bare glass is glued to an aluminum tab, taking care that a very slight extension of the coated fiber is outside of the aluminum tab to prevent the glue from wicking to the coated fiber/bare glass interface. The bare glass is glued to another aluminum tab, such that the distance between the two aluminum tabs is about 5 mm. Dynamic Mechanical Analysis is carried out on the test sample using, for example, a Dynamic Mechanical Thermal Analyzer (DMTA-IV), available from Rheometric Scientific, Piscataway N.J., at room temperature. The aluminum tabs are mounted in the grips of the DMTA-IV such that the fiber sample is completely vertical and has no stress or strain applied to the sample. A force (F) is applied to the glass end of the fiber while measuring the displacement (u) using the DMTA-IV. The force is applied at a rate of 8.1 micron/min. A shear modulus value ($G_p$) of the primary coating is calculated using:

$$G_p = \frac{F\ln(R_p/R_f)}{2\pi L_{emb}u}$$

Rp is the radius of the primary coating;
Rf is the radius of glass; and
Lemb is the length of the embedded, or glued, section.
The Young's modulus value (E) may then be calculated using the empirical shear modulus value ($G_p$) and the Poisson's ratio value (v) for the primary coating, by applying the formula:

$$E=2G_p(1+v)$$

In operation, monitor fiber 22, being in communication with transmitter 38, may carry a signal to, for example, receiver 39. In exemplary embodiments, the signal is a single wave length in the so called C or L band; that is to say with a single wavelength from about 1535 nm to about 1625 nm. In some embodiments, at least 5% of the signal along monitor fiber 22 may be used to monitor the status of the optical cable. In other embodiments, at least 50% of the signal along monitor fiber 22 may be used to monitor the status of the optical cable. Such an embodiment may have, for example, a passive 1×2, 50/50 optical splitter, or other suitable splitter device or module of varying values to divide any optical signal in monitor fiber 22 into, for example, network traffic and the monitor signal, with the monitor signal having a strength, for example, from about equal to greater than the network traffic signal that may be traveling within monitor fiber 22. Other splitter configurations, for example, 1×3, 1×4, etc., may be suitable. Any amount of network traffic signal that may be traveling in monitor fiber 22, having been diverted by the optical splitter device, may be routed to, for example, amplifier 33 and subsequently sent to a further destination, for example, along another cable 10 to another hub 30, and may travel along another monitor fiber 22 or may be routed into another optical fiber. In further exemplary embodiments, up to 100% of the signal along the monitor fiber may be used to monitor the status of the optical cable. For example, monitor fiber 22 may be terminated and routed to communicate with, for example, monitor transmitter 38 and monitor receiver 39, with no such splitter device used.

An increase in overall attenuation, for example, from 0.5 dB to 3.5 dB overall, of the signal by receiver 39 may trigger, for example, an alarm 50. In exemplary embodiments, an increase of from 1.0 dB to 3.0 dB may trigger alarm 50. Transmitter 38, receiver 39 and alarm 50 may be part of a monitoring equipment station within hub 30, in exemplary embodiments taking the form of an electronic monitor card which may be loaded in equipment racks near the amplifiers and dispersion compensation modules. Alarm 50 may include, for example, an indicator light on receiver 39, an email alert sent to a predetermined destination, a communication sent to a more comprehensive monitoring station, for example, a shelf controller, located proximate to hub 30. The dynamic range, for example, of the monitoring equipment may be from 12 dB (70 km*0.2 dB/km) to 60 dB (100 km*0.6 dB/km).

Monitor fiber 22, being more mechanically sensitive to mechanical stresses than the remaining optical fibers of cable 10, may lose power sooner than the other optical fibers, For example, in the event of a water intrusion into jacket 12, water swellable tape 18 may create a microbending event on one of the fibers. Once alarm 50 is triggered, other techniques may be used to then pinpoint the exact location of the attenuation event so that remedial steps may be taken, for example, to prevent further subscriber signal loss, or permanent damage to cable 10. Monitor fiber 22, having a high bandwidth signal and being located on an edge of monitor ribbon 20, may begin to lose power and trigger alarm 50 before the other optical fibers lose enough power to degrade the network traffic signal. Loss of power in monitor fiber 22 may be used as an early warning indicator. Traditional monitoring techniques, e.g., an OTDR, may be used if catastrophic system degradation occurred, causing the optical fibers, for example, the corner fiber positions to "go dark," or lose all power.

Unless otherwise expressly stated, it is in no way intended that any method set out herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosed adapter plate and adapter plate assembly. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A system for monitoring the status of an optical cable, comprising:
    an optical cable, the optical cable including a jacket defining an interior, and at least one array of optical fibers within the interior, the at least one array including at least one monitor fiber and at least one other optical fiber,
    the at least one monitor fiber having a higher mechanical sensitivity to elevated mechanical stresses than the at least one other optical fiber;
    at least one transmitter, the at least one transmitter in communication with the at least one monitor fiber, the transmitter operative to send a signal along the at least one monitor fiber;
    at least one receiver, the at least one receiver in communication with the at least one monitor fiber, the receiver operative to receive the signal from the at least one monitor fiber; and
    an alarm operative to indicate an increased attenuation of the signal, the alarm being in communication with the at least one receiver,
    the increased attenuation of the signal along the at least one monitor fiber being indicative of the status of the optical cable.

2. The system of claim 1, the monitor fiber having a MAC value from about 0.0 to about 0.8 higher than the at least one other optical fiber.

3. The system of claim 1, the monitor fiber having a MAC value from about 0.0 to about 0.5 higher than the at least one other optical fiber.

4. The system of claim 1, at least 50% of the signal being for monitoring the status of the optical cable.

5. The system of claim 1, the array of optical fibers being at least one optical ribbon stack, the at least one monitor fiber being located in a ribbon of the optical fiber ribbon stack defining at least one monitor ribbon in the stack, the stack having at least one other optical fiber ribbon.

6. The system of claim 5, the at least one monitor fiber being located on an edge of the monitor ribbon.

7. The system of claim 5, the at least one monitor ribbon having at least two monitor fibers, the at least two monitor fibers being located on opposite edges of the at least one monitor ribbon.

8. The system of claim 5, the at least one optical ribbon stack including at least two monitor ribbons, each monitor ribbon including at least one monitor fiber.

9. The system of claim 8, each of the monitor fibers being located on an edge of each of the respective monitor ribbons.

10. The system of claim 8, the at least two monitor ribbons having at least two monitor fibers, the at least two monitor fibers being located on opposite edges of the at least two monitor ribbons.

11. The system of claim 10, the at least two monitor ribbons being located on opposite ends of the at least one optical ribbon stack.

12. The system of claim 1, the at least one monitor fiber having an inner primary coating modulus value from about 0.5 MPa to about 1.5 MPa higher than the at least one other optical fiber.

13. The system of claim 1, the alarm including a monitor card in communication with the at least one receiver, the monitor card operative to indicate the increased attenuation of the signal in the at least one monitor fiber.

14. The system of claim 1, the signal having a wavelength from about 1535 nm to about 1625 nm.

15. The system of claim 14, the alarm being operative to indicate the increased attenuation of the signal from about 1.0 dB to about 3.0 dB.

16. The system of claim 1, the at least one array being at least one optical ribbon stack having at least four monitor fibers, each of the at least four monitor fibers being located at one of four corner locations on the at least one optical ribbon stack.

17. An optical cable having status monitoring fibers, comprising:
    a jacket defining an interior; and at least one array of optical fibers within the interior, the array including at least one monitor fiber and at least one other optical fiber, the at least one monitor fiber having a higher mechanical sensitivity to elevated mechanical stresses than the at least one other optical fiber.

18. The cable of claim 17, the monitor fiber having a MAC value from about 0.0 to about 0.8 higher than the at least one other optical fiber.

19. The cable of claim 17, the monitor fiber having a MAC value from about 0.0 to about 0.5 higher than the at least one other optical fiber.

20. The cable of claim 17, the at least one monitor fiber having an inner primary coating modulus value from about 0.5 MPa to about 1.5 MPa higher than the at least one other optical fiber.

21. The cable of claim 17, the array of optical fibers being at least one optical ribbon stack, the at least one monitor fiber being located in a ribbon of the optical fiber ribbon stack defining at least one monitor ribbon in the stack, the stack having at least one other optical fiber ribbon.

22. The cable of claim 21, the at least one monitor fiber being located on an edge of the monitor ribbon.

23. The cable of claim 21, the at least one monitor ribbon including at least two monitor fibers, the at least two monitor fibers being located on opposite edges of the at least one monitor ribbon.

24. The cable of claim 21, the at least one optical ribbon stack including at least two monitor ribbons, each monitor ribbon including at least one monitor fiber.

25. The cable of claim 21, the at least one optical ribbon stack including at least two monitor ribbons, each monitor ribbon including at least one monitor fiber on an edge thereof.

26. The cable of claim 21, the at least one optical ribbon stack including at least two monitor ribbons, each monitor ribbon including at least two monitor fibers.

27. The cable of claim 26, the at least two monitor fibers being located on opposite edges of each of the at least two monitor ribbons.

28. The system of claim 17, the at least one array being at least one optical ribbon stack having at least four monitor fibers, each of the at least four monitor fibers being located at one of four corner locations on the at least one optical ribbon stack.

29. A method for monitoring the status of an optical cable, comprising:

providing a transmitter;

providing a receiver;

providing an alarm, the alarm being in communication with the receiver;

providing an optical cable according to claim 17;

transmitting a signal from about 1535 nm to about 1625 nm along the monitor fiber;

receiving the signal sent along the monitor fiber;

evaluating any attenuation from the monitor fiber, the attenuation being indicative of the status of the optical cable; and sending an alert to the alarm to indicate an increased attenuation in the monitor fiber.

* * * * *